(12) United States Patent
Roberts et al.

(10) Patent No.: US 7,289,812 B1
(45) Date of Patent: Oct. 30, 2007

(54) LOCATION-BASED BOOKMARKS

(75) Inventors: Baron L. Roberts, Sunnyvale, CA (US); Gordon Durand, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 710 days.

(21) Appl. No.: 10/028,038

(22) Filed: Dec. 20, 2001

(51) Int. Cl.
*H04Q 7/20* (2006.01)

(52) U.S. Cl. ............................ 455/456.1; 455/456.2; 455/456.3; 455/457; 455/414.1; 455/566; 455/426.1; 701/200; 701/211; 342/350; 342/450

(58) Field of Classification Search ............ 455/456.1, 455/456.2, 456.3, 457, 414.1, 414.3, 412.1, 455/412.2, 186.1, 566, 550.1, 432.1, 421, 455/426.1, 418, 456.5; 701/200, 213, 211, 701/208; 342/350, 450
See application file for complete search history.

(56) References Cited

U.S. PATENT DOCUMENTS

| | | | | |
|---|---|---|---|---|
| 5,559,520 | A * | 9/1996 | Barzegar et al. | 342/357.1 |
| 5,895,471 | A | 4/1999 | King et al. | |
| 6,032,162 | A | 2/2000 | Burke | |
| 6,091,956 | A * | 7/2000 | Hollenberg | 455/456.5 |
| 6,119,014 | A * | 9/2000 | Alperovich et al. | 455/466 |
| 2002/0035609 | A1* | 3/2002 | Lessard et al. | 709/217 |

OTHER PUBLICATIONS

Field Manual No. 3-25.26, Department of the Army, Appendix J "Global Positioning System", Jul. 20, 2001, 10 pages.
Rekimoto, Ayatsuka and Hayashi, "Augment-able Reality: Situated Communication Through Physical and Digital Spaces", IEEE 2nd International Symposium on Wearable Computers (ISWC '98), pp. 68-75, 1998.
Bederson, "Audio Augmented Reality: A Prototype Automated Tour Guide", http://www.cs.umd.edu/~bederson/papers/chi-95-aar/, 1995, 4 pages.
Rozier, "Hear & There: An Augmented Reality System of Linked Audio", MIT Media Lab, 2000, 6 pages.
"Zeppelin Museum Friedrichshafen, Audio Guide", http://www.zeppelin-museum.de/Text_Audio.en.htm, downloaded on Aug. 30, 2002.
"GPS 12 Personal Navigator, Owner's Manual & Reference", http://www.garmin.com/manuals/GPS12_OwnersManual.pdf, Garmin Corporation, Jan. 1999, 66 pages.
Dommety, Gopal et al; "Potential Networking Applications of Global Positioning Systems (GPS)"; OSU Technical report TR-24, Apr. 1996; p. 1-40.

* cited by examiner

*Primary Examiner*—Joseph Feild
*Assistant Examiner*—Pierre-Louis Desir
(74) *Attorney, Agent, or Firm*—Fish & Richardson P.C.

(57) ABSTRACT

Methods and apparatus, including computer program products, implementing and using techniques for using a location aware device to determine a current location, recording a location bookmark for the current location using the location aware device, storing the location bookmark, detecting at some later time that a location of the location aware device is within a specified proximity to the bookmark location and that a user-defined condition is satisfied by the bookmark content, and automatically notifying a user of the location aware device of the location bookmark. A location bookmark includes a bookmark location and bookmark content, the bookmark location being the current location and the bookmark content including data associated with the current location.

16 Claims, 2 Drawing Sheets

LOCATION-BASED BOOKMARKS

BACKGROUND OF THE INVENTION

The present invention relates to using a location aware device.

A device can be made location aware in a variety of ways. The device can include an embedded apparatus for determining location, such as a GPS receiver, an inertial navigation system (INS), or a triangulation system based on characteristics of wireless signals such as signals transmitted by cell phone station antennas. Alternatively, the device can have an interface to interact with an external location-determining system that determines the device's location based on a signal received from the device, for example, by triangulation. Location aware devices exist that are capable of recording a location and of associating a textual name with the recorded location.

SUMMARY OF THE INVENTION

The present invention provides methods and apparatus, including computer program products, for recording and recalling data associated with a location.

In general, in one aspect, a method in accordance with the invention includes using a location aware device to determine a current location. The method includes recording and storing a location bookmark for the current location using the location aware device. A location bookmark has a bookmark location and bookmark content, the bookmark location being the current location and the bookmark content including data associated with the current location. The method includes detecting at some later time that a location of the location aware device is within a specified proximity to the bookmark location and that a user-defined condition is satisfied by the bookmark content, and automatically notifying a user of the location aware device of the location bookmark.

In general, in another aspect, the invention features a device including a means for determining a current location of the device and a means for obtaining data associated with the current location of the device. The device further includes a means for recording a location bookmark, a means for storing the location bookmark, and a means for retrieving the location bookmark from storage. The device includes a means for determining that the device is close to the bookmark location of a previously-stored location bookmark and that a user-defined condition is satisfied by the bookmark content, and automatically notifying a user of the device of the previously-stored location bookmark.

Embodiments can include one or more of the following. The means for determining a current location can include a receiver for receiving a wireless data transmission indicating the current location transmitted by a server in a cellular network that used a signal received by a cellular tower from the location aware device to determine a geographic location of the location aware device based on the signal, or a global positioning system receiver. The means for obtaining data can include a digital camera, voice recorder and keypad. The means for recording a location bookmark can include a memory element incorporated in the device. The memory element can be a volatile semiconductor memory or a non-volatile semiconductor memory or a microdisk. The means for storing the location bookmark can include a transmitter for transmitting the bookmark to a remote server. The means for retrieving the location bookmark can include a receiver for receiving the location bookmark from storage.

The means for determining that the device is close to the location of a previously-stored location bookmark can include a processor programmed to compare the current location of the device with the bookmark locations of a set of previously-stored location bookmarks in reference to user-defined radius of interest. The means for determining that a user-defined condition is satisfied by the bookmark content can include a processor programmed to query the bookmark content of a set of previously-stored location bookmarks in reference to a user-defined condition.

In general, in another aspect, the invention features a device including a means for determining a current location of the device. The device further includes a means for retrieving a location bookmark from a set of previously-stored location bookmarks, a location bookmark including a location and data associated with the location, and a means for determining that the device is close to the location of a previously-stored location bookmark and that a user-defined condition is satisfied by the data associated with the location and automatically notifying a user of the device of the previously-stored location bookmark.

In general, in another aspect, the invention features a system including a device operable to determine a current location of the device, a set of location bookmarks, a processor programmed to determine whether the device is close to the bookmark location of a location bookmark in the set of location bookmarks and whether a user-defined condition is satisfied by the bookmark content, and a means for automatically notifying a user of the device that there is a location bookmark having a bookmark location close to the current location of the device and having bookmark content satisfying a user-defined condition. The processor is programmed to determine whether the device is close to the bookmark location by comparing the current location of the device with the bookmark locations of the set of location bookmarks in reference to a user-defined radius of interest, and whether a user-defined condition is satisfied by the bookmark content by querying the bookmark content of the set of location bookmarks in reference to a user-defined condition. In another aspect, the device included in the system can include a means for receiving a set of location bookmarks, and the device can include the processor and the means for automatically notifying a user of the device that there is a location bookmark having a bookmark location close to the current location of the device and having bookmark content satisfying a user-defined condition.

The invention can be implemented to realize one or more of the following advantages. Data captured at a location can be conveniently coupled with accurate location information. A location aware device can bookmark a location of interest to a user of the device, while the user and the location aware device are at the location, and the user can be notified of the location of interest upon returning to, or close to, the location. The location aware device can retrieve recorded location bookmarks for review by the user, to make use of data captured while at a bookmark location. Applications of the invention are diverse, including use in accident investigation for mapping an accident scene and use in the travel industry for providing self-guided tours.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1:
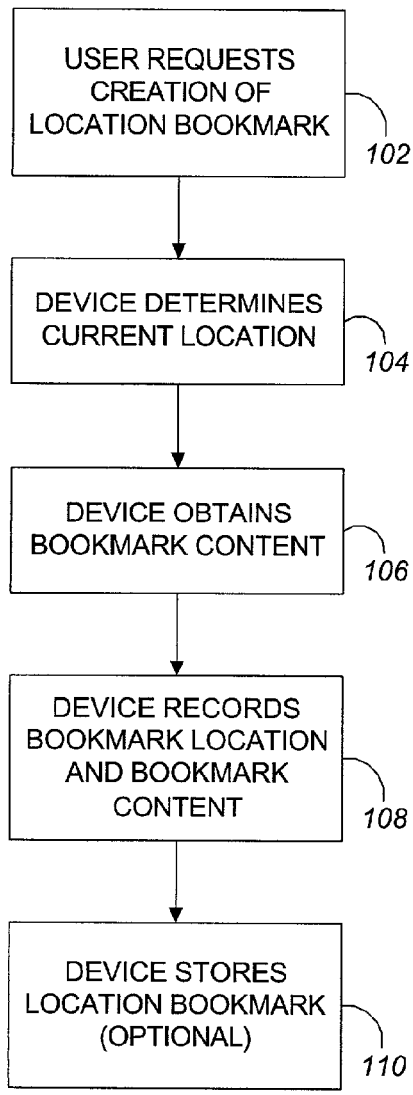
FIG. 1 is a flowchart of steps for recording a location bookmark in accordance with the invention.
Figure 2:
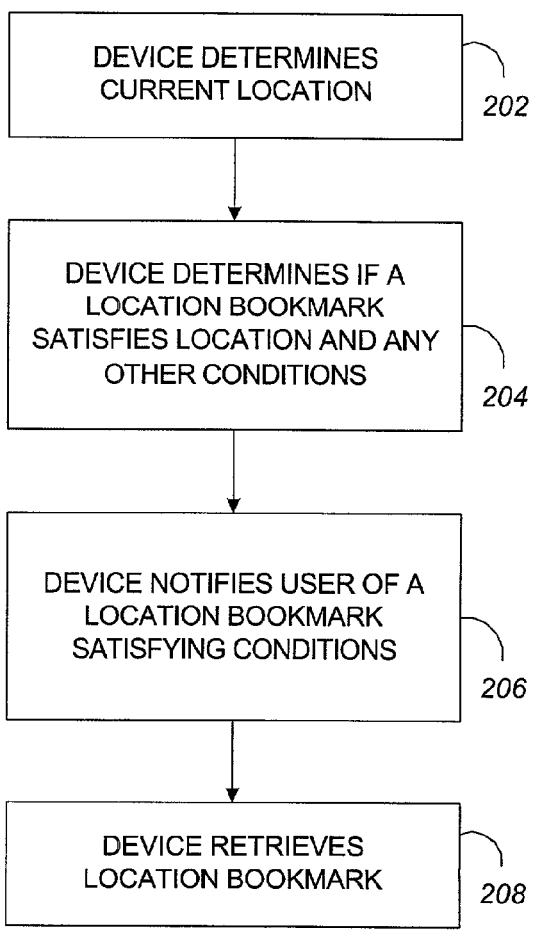
FIG. 2 is a flowchart of steps for recalling a location bookmark in accordance with the invention.

FIGS. 1 and 2 show steps that can be performed by a user and a location aware device in recording and recalling a location bookmark. A user of a location aware device can request the creation of a location bookmark for a current location of the device (102). This can be done through any form of user interface available on the device. A location bookmark includes a geographic location and bookmark content, which are associated with each other to define the bookmark. Optionally, a location bookmark can include other kinds of information, for example, the time when the bookmark was made.

The location part of a location bookmark may, for the sake of clarity, be referred to as the bookmark location. When the device creates a location bookmark for its current location, the bookmark location is the current location of the device at that time. Bookmark content is data that the bookmark associates with the location. The device determines the current location of the device (104) and obtains bookmark content (106), either automatically or by receiving input from the user. The location and bookmark content are then recorded by the device as the location bookmark (108). Optionally, the location bookmark can be stored or archived outside the device (110). For example, the bookmark, or multiple bookmarks, can be uploaded from the device to a database for use by the user on the same or different location aware devices.

The device, being location aware, can detect at a later time its current location (202) and determine whether the device is at, or within a specified proximity to, the bookmark location of a previously-recorded location bookmark (204). The proximity condition can be set by the user. The proximity condition can optionally be qualified by one or more user-defined conditions (204). If a location bookmark satisfies the proximity and any content conditions, then, as a user-selectable option, the device can automatically notify the user of the device of existence of the location bookmark (206). The device can then retrieve the location bookmark or bookmarks that satisfy the conditions (208) for presentation to the user, either automatically or in response to a user request.

A location can be represented in any convenient form, including latitude and longitude or Universal Transverse Mercator (UTM) coordinates. A location can be represented with reference to any grid or other system for defining a location. Additionally, an elevation of the geographic location can be included as part of a bookmark location.

In addition to being represented as a point, a location can optionally be represented as an area, in which case a test for proximity would be satisfied when the device is within the area or within a user-defined or device-defined distance from the area. Optionally, a single bookmark can have its location represented in multiple forms—for example, both as a point on a longitude and latitude grid and as an area defined by a landmark—or at multiple levels of precision—for example, at the National Mall and at the Lincoln Memorial, the Lincoln Memorial defining a smaller area within a larger area defined by the National Mall.

In one implementation, the location aware device can display a map on a user interface indicating a current location of the device to a user and displaying the surrounding area. Optionally, the user can control the display of the map to either zoom in or zoom out to show differing degrees of detail and surrounding area. The user can use the map to define a bookmark location. For example, the user could use a stylus to trace an area directly onto the map, which traced area would define the bookmark location. In this manner, a user could, for example, define a bookmark location as an area defined by a landmark.

Bookmark content can include any kind of content that can by captured by or provided to the location aware device. Thus, depending on the capabilities of the device, the bookmark content of a location bookmark can include multimedia content, for example, still images, video recordings, voice and sound recordings and text. The bookmark content of a location bookmark can also include descriptive content, for example, text data or voice recordings describing the current location, for example, a street address or name of a business at the location; describing the time of recording the location bookmark; describing the environmental conditions at the time of recording; or describing the multimedia content, for example, a description of an image captured at the location. The descriptive content can be generated automatically, for example, from information received electronically by the device from a local transmitter, from a Web site accessed by the device through a wireless connection, for example, a WAP (Wireless Application Protocol) connection, or from a clock maintained by the device. The descriptive content can also be derived from a speech-to-text conversion of information provided orally to the device by the user through a microphone, which can be connected to the device directly or through a wireless connection, for example, through a Bluetooth™ connection.

Bookmark content can be represented in a location bookmark either in direct form, or in the form of pointers or links that can be followed to obtain the content, either from storage in the device or remote from the device, or in a combination of both forms.

Figure 3:
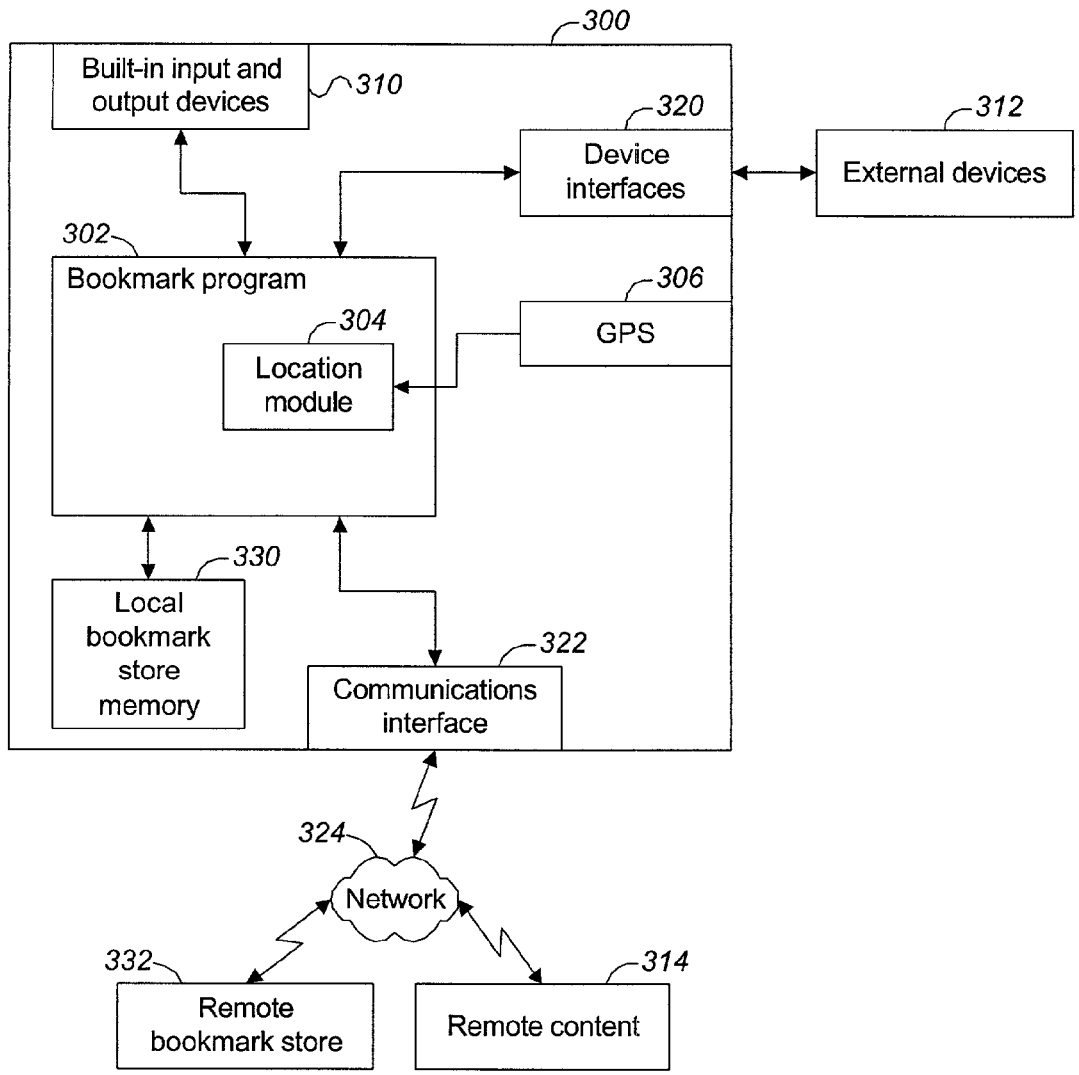
FIG. 3 is a schematic block diagram of a location aware device for recording and recalling location bookmarks in accordance with the invention.

As shown in FIG. 3, in one implementation, a location aware device 300 for recording and recalling location bookmarks performs the following functions. It determines a current location of the device, obtains bookmark content, stores location bookmarks in the device, and identifies and retrieves bookmarks that satisfy proximity and content conditions. These functions are performed by or under control of a bookmark program 302, implemented as an application running on an embedded processor and operating system in the device, in response to user requests.

The program has a location module 304 that determines a current location of the device using an embedded location-determining device, for example, a GPS receiver 306 or an INS. Alternatively, or in addition, the device 300 can be implemented to receive location information from an external source. For example, the device can be implemented with a receiver capable of receiving a wireless data transmission indicating the location of the device from a remote location-determining device, e.g., a server in a cellular telephone network that uses a signal received by a cellular tower antenna or antennas from the device to determine the geographic location of the device based on the signal.

The location module can determine and identify the current location with reference to one or more default or user-selected coordinate systems, grids, or reference maps. Thus, location can be determined and represented using latitude and longitude, universal transverse mercator (UTM), or other conventional geographical coordinates. In addition, the module can optionally identify location with respect to a grid or with respect to areas defined by a map provided or selected by a user, identifying the current location as being at a grid location on the map or in one or more areas defined on the map (for example, neighborhoods, districts, parks, or places of interest) or at a landmark or other site defined on the map. Optionally, a map can be used that defines for particular sites respective areas within which the device will be considered to be at the site, or the user or device can specify a distance for that purpose.

The program obtains bookmark content from one or more input devices, which can be either internal devices 310 or external devices 312. Example input devices include a still digital camera, a video camera, a clock, a microphone, or a keypad or touch sensitive screen, either integrated into or attached to the device 300. The user can use such devices to obtain content. A built-in or external display device and a keypad or touch sensitive screen allows a user to interact with the device 300 over a user interface, for example, a graphical user interface or a menu based user interface. Optionally, the program 302 can be configured to receive content through a communications interface 322 and communications network 324 from a remote content site 314, for example, a Web site that provides current weather information for a requested location. Optionally, the device can be implemented to support the WAP and WAP services, for example, version 2.0 of the WAP, so that the device 300 supports a WAP microbrowser and interactions with WAP-based Web applications, including applications that push information to the device 300 as a client, and in particular, applications that do so in response to receiving the location of the device.

The program 302 stores location bookmarks in a local memory 330 of the device 300 that is used as a local store for location bookmarks. The local memory can be a volatile semiconductor memory, a non-volatile semiconductor memory, a microdisk, or any other form of memory. It is advantageous for the local memory to be persistent in the sense that it maintains its data even in the absence of power.

Optionally, location bookmarks can be stored outside the device 300, or received from outside the device 300. In one implementation, the device 300 has a data communications interface, e.g., an interface complying with the USB (Universal Serial Bus) version 1.1 or version 2.0 specification or the IEEE (Institute of Electrical and Electronics Engineers) 1394 standard, so that the device can be connected as a peripheral to a host device, for example, a personal computer. A program on the host device is provided to read location bookmarks from the device 300, to store location bookmarks on the host device or elsewhere, and to store or restore location bookmarks on the device 300. This host program can optionally provide further services, such as allowing a user to edit, catalog, and share location bookmarks, as well as to obtain location bookmarks from third parties, e.g., third party travel services. The functions of a host program can also be implemented in a Web-based application, for example, an application delivered by an ASP (Application Service Provider), which can maintain a remote store of location bookmarks 332 for the user. In a further alternative, the device 300 can be programmed as a host device to which a USB, IEEE 1394, or other storage device is connected as a peripheral device.

The program 302 can be implemented to allow the user to manage location bookmarks in one or more of the following ways. The user can archive bookmarks. The user can delete bookmarks. The user can organize bookmarks into categories for later searching and retrieval. The user can add annotations to bookmarks, which can be used for searching and retrieval. The user can edit bookmarks to add content to, or delete content from, bookmarks.

The device 300 can notify the user when the user has arrived at a bookmark location, for example, by emitting an audible signal, by causing the device to vibrate, or by flashing a visual signal. The device can receive input from a user defining the proximity and content conditions, if any, that a previously-stored location bookmark must satisfy before the device 300 should notify the user about the location bookmark. The user can define a proximity condition by specifying a radius of interest to determine whether the user is at a bookmark location. The user can also define a content condition that must be satisfied by the bookmark content of the previously-stored location bookmarks. For example, the content condition can require that location bookmarks only be retrieved if they contain a certain type of multimedia content, such as an image. As another example, the content condition can require that a location bookmark only be retrieved if the location bookmark contains bookmark content about a restaurant at the bookmark location.

The program 302 searches the location bookmarks stored in the local memory 330 to determine whether the current location of the device 300 satisfies the proximity condition, that is, whether the device is considered to be at a bookmark location for one or more of the bookmarks. Optionally, the program can be implemented to perform bookmark searches, or to cause searches to be performed, on remotely stored location bookmarks, either automatically or in response to a specific user request. As a further option, the program can be implemented to receive location bookmarks from a remote application or server for locations in the general vicinity of the device 300, either by request or as pushed information, based on location information provided by the device 300 to the remote application or server. Such transmitted bookmarks can advantageously be used to provide current information about special offers or events taking place where the user is located.

Having been notified that the device 300 is at a bookmark location, the user can review bookmark content of the location bookmarks for the location through the output devices that are part of, or attached to, the location aware device 300. If there are multiple bookmarks for the location, they can optionally be displayed by bookmark location, by proximity of location, by specificity of location, by subject matter of the bookmark content, or chronologically by time of recording the location bookmarks.

A location aware device can be implemented to use pre-recorded location bookmarks. For example, a commercial travel company can provide location bookmarks for tourist attractions found in a particular city, which can be made accessible to anyone with a location aware device, either for downloading to the device or for remote access. In another example, a venue, for example a zoo or a convention center, can provide visitors with a location aware device that can communicate with a server that stores a set of location bookmarks for exhibits or attractions. The venue can also provide its bookmarks to visitors for use in location aware devices belonging to the visitors, so that a visitor can including the bookmarks in the visitor's own collection.

A variety of portable devices can be implemented as location aware devices in accordance with the invention, for example, mobile telephones, personal digital assistants (PDAs), digital still cameras, digital video cameras, handheld and other personal computers, and digital audio players. In addition, the invention can be implemented as part of or as an addition to user electronics such as radios, GPS devices, and cell phones of automobiles, motorcycles, and other vehicles.

The processes performed by the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results.

What is claimed is:

1. A method for recording and recalling data associated with a location, the method comprising:
   using a location aware device to determine a current location;
   receiving at a first time a user-selected input related to the current location, the user-selected input being captured at the current location in response to a user action by an input device integrated into or attached to the location aware device;
   recording a location bookmark for the current location using the location aware device, a location bookmark having a bookmark location and bookmark content, the bookmark location comprising the current location and the bookmark content comprising the received user-selected input;
   storing the location bookmark;
   detecting at a second later time that a location of the location aware device is within a specified proximity to the bookmark location and that a user-defined condition, other than that the location is within a specified proximity to the bookmark location, is satisfied by the user-selected input comprising the bookmark content and in response to the detecting automatically notifying a user of the location aware device of the location bookmark; and
   presenting the user-selected input included in the bookmark content as part of the location bookmark through an output device of the location aware device, at a time after the first time.

2. The method of claim 1, wherein a current location is determined by:
   using a global positioning system receiver;
   using an inertial navigation system; or
   receiving a wireless data transmission indicating the current location transmitted by a server in a cellular network that used a signal received by a cellular tower from the location aware device to determine a geographic location of the location aware device based on the signal.

3. The method of claim 1, wherein:
   the user-selected input comprises multimedia content captured at the current location.

4. The method of claim 3, wherein:
   bookmark content fixer comprises descriptive content describing at least one of the following:
   the current location;
   the time of recording the location bookmark;
   the environmental conditions at the current location; or
   the multimedia content captured at the current location.

5. The method of claim 1, wherein:
   the bookmark location and the bookmark content are stored in a searchable database as key-value pairs having user-defined keys and values.

6. The method of claim 1, further comprising:
   displaying a plurality of location bookmarks to a user, wherein the location bookmarks are grouped:
   by bookmark location;
   by subject matter of the bookmark content; or
   chronologically by time of recording the location bookmarks.

7. The method of claim 1, wherein recording a location bookmark for the current location comprises recording at least one of the following:
   latitude and longitude of the current location; or
   universal transverse Mercator coordinates of the current location.

8. The method of claim 7, further comprising recording an elevation of the current location as part of the location bookmark.

9. The method of claim 1, wherein automatically notifying a user of the location aware device of the location bookmark comprises emitting a signal from the location aware device detectable by the user, including an audio signal, visual signal or a mechanical signal including a vibration.

10. A device, comprising:
   means for determining a current location of the device;
   means for, at a first time, capturing a user-selected input associated with the current location of the device;
   means for recording a location bookmark, a location bookmark including a bookmark location comprising the current location and bookmark content comprising the captured user-selected input;
   means for storing the location bookmark;
   means for, at a second later time, retrieving the location bookmark from storage in response to a determination that the device is close to the bookmark location and that a user-defined condition, other than that the location is within a specified proximity to the bookmark location, is satisfied by the user-selected input comprising the bookmark content and;
   means for determining that the device is close to the bookmark location of a previously-stored location bookmark and that a user-defined condition is satisfied by the user-selected input and automatically notifying a user of the device of the previously-stored location bookmark; and
   means for, at a time after the first time, presenting the user-selected input included in the bookmark content as part of the location bookmark.

11. The device of claim 10, wherein:
   the means for determining a current location comprise:
      a receiver for receiving a wireless data transmission indicating the current location transmitted by a server in a cellular network that used a signal received by a cellular tower from the location aware device to determine a geographic location of the location aware device based on the signal; or
      a global positioning system receiver;
   the means for capturing a user-selected input comprise a digital camera, voice recorder or keypad;
   the means for recording a location bookmark comprise a memory element incorporated in the device;
   the means for storing the location bookmark comprise a transmitter for transmitting the bookmark to a remote server;
   the means for retrieving the location bookmark comprise a receiver for receiving the location bookmark from storage;
   the means for determining that the device is close to the location of a previously-stored location bookmark comprise a processor programmed to compare the current location of the device with the bookmark locations of a set of previously-stored location bookmarks in reference to user-defined radius of interest;
   the means for determining that a user-defined condition is satisfied by the bookmark content comprise a processor programmed to query the bookmark content of a set of previously-stored location bookmarks in reference to a user-defined condition; and
   user-selected input associated with the current location comprises multimedia content captured at the current location and descriptive content about the current location, time of capture, environmental conditions or the multimedia content.

12. The device of claim 11, wherein:
   the memory element is a volatile semiconductor memory or a non-volatile semiconductor memory or a microdisk.

13. The device of claim 10, wherein:
   the bookmark location and bookmark content are stored in a searchable database as key-value pairs having user-defined keys and value.

14. The method of claim 1, wherein the user-selected input includes at least one of the following: an audio input, a textual input or a digital image input.

15. The device of claim 10, wherein means for capturing user-selected input comprise means for capturing at least one of the following: audio input, textual input or digital image input.

16. The method of claim 1, wherein the user-defined condition satisfied by the bookmark content comprises a condition satisfied by the user-selected input.

* * * * *